*(12)* United States Patent
Koehler et al.

(10) Patent No.: US 12,446,575 B1
(45) Date of Patent: Oct. 21, 2025

(54) DURABLE AND EDIBLE BAIT ROLL UPS, SYSTEMS AND METHODS

(71) Applicants: Florida Insect Control Group, LLC, Gainesville, FL (US); Virginia Tech Intellectual Properties, Inc., Blacksburg, VA (US)

(72) Inventors: Philip G. Koehler, Gainesville, FL (US); Enrico Paolo Levi, Modena (IT); Dini Miller, Christiansburg, VA (US); Morgan Wilson, Catawba, VA (US)

(73) Assignee: Florida Insect Control Group LLC, Gainesville, FL (US)

( * ) Notice: Subject to any disclaimer, the term of this patent is extended or adjusted under 35 U.S.C. 154(b) by 775 days.

(21) Appl. No.: 17/539,269

(22) Filed: Dec. 1, 2021

Related U.S. Application Data

(60) Provisional application No. 63/120,366, filed on Dec. 2, 2020.

(51) Int. Cl.
*A01N 25/04* (2006.01)
*A01N 25/00* (2006.01)

(52) U.S. Cl.
CPC ........... *A01N 25/04* (2013.01); *A01N 25/006* (2013.01)

(58) Field of Classification Search
CPC .......................... A01M 1/02; A01M 1/2011; A01M 2200/011; A01M 2200/012; A01M 1/2005; A01M 1/106; A01M 1/026; A01M 2200/01; A01M 1/00; A01M 1/20; A01M 25/002; A01M 1/103; A01N 25/006; A01N 25/04; A01N 25/002; A01N 25/12; A01N 25/26; A01N 25/34

USPC ............... 424/84, 417, 410, 489; 426/1, 2, 5
See application file for complete search history.

(56) References Cited

U.S. PATENT DOCUMENTS

| 2,157,625 | A | 5/1939 | Page, Jr. |
| 3,470,293 | A * | 9/1969 | Geiger ................. A01N 25/006 514/136 |
| 6,553,726 | B1 | 4/2003 | Roberts |
| 6,837,008 | B2 | 1/2005 | Roberts et al. |
| 6,912,815 | B1 | 7/2005 | Koehler et al. |

(Continued)

FOREIGN PATENT DOCUMENTS

| CN | 111264546 A * | 6/2020 | ............. A01N 43/90 |
| KR | 2018050799 A * | 5/2018 | ............... A23L 7/10 |

OTHER PUBLICATIONS

Chou et al. CN 111264546, machine translation, filed date Dec. 5, 2018, published date Jun. 12, 2020, pp. 1-10 (Year: 2020).*

(Continued)

*Primary Examiner* — Hong T Yoo
(74) *Attorney, Agent, or Firm* — Brian S. Steinberger; Hilary F. Steinberger; Steinberger IP Law (57) ABSTRACT

Bait stations, devices, apparatus, systems and methods for providing cockroach gel baits rolled in a wax coated edible paper. Bait Roll-ups include gel baits encapsulated in a coated edible rice paper are intended for killing insects. The Bait Roll-up can be handled by bait applicators without physically touching the gel bait. The Bait Roll-up can also be applied directly to cockroach harborages without exposing surfaces to insecticide. Applicators can handle the Bait Roll-ups without physically touching the gel bait, thus reducing any potential for contamination.

6 Claims, 6 Drawing Sheets

(56) References Cited

U.S. PATENT DOCUMENTS 8,519,264 B2 8/2013 Leslie et al.
2013/0091758 A1* 4/2013 Hiley .................. A01N 25/006
43/132.1

OTHER PUBLICATIONS

Kang, KR 2018050799, machine translation, published date May 16, 2018, pp. 1-2. (Year: 2018).*

* cited by examiner

DURABLE AND EDIBLE BAIT ROLL UPS, SYSTEMS AND METHODS

CROSS REFERENCE TO RELATED APPLICATION

This application claims the benefit of priority to U.S. Provisional Application Ser. No. 63/120,366 filed Dec. 2, 2020, which is incorporated herein by specific reference thereto.

FIELD OF INVENTION

This invention relates to baits for insects, and in particular to bait stations, devices, apparatus, systems and methods for providing cockroach gel baits encapsulated with a wax coated edible paper. The Bait Roll-ups contain preweighed (approximately ¼ gram to approximately 5 grams) cockroach gel bait formulated for killing insects, such as but not limited to cockroaches. Applicators can handle the Bait Roll-ups without physically touching the gel bait, thus reducing any potential for contamination.

BACKGROUND AND PRIOR ART

Gel baits for insects have generally consisted of an active ingredient formulated in an attractive food matrix. Gel baits are usually applied using syringes so that the applicator can place tiny droplets of gel bait on household surfaces (cracks and crevices, cabinet hinges, plumbing penetrations, and the like).

Currently, gel baits that are not consumed require physical removal from the environment, which is rarely done. Therefore, gel baits that are not consumed often persist in peoples' homes, restaurants, and hospitals for years. Old bait is unsightly and not palatable to insects, yet the removal process is difficult.

Because gel baits are currently placed directly on surfaces that are exposed to the environment, they can be distastefully contaminated with consumer use insecticides, dust, cleaning products, and other airborne particles. In addition, exposed gel baits will lose moisture over time due to evaporation, so that they are no longer desirable for consumption.

In conclusion, the need exists for solutions to the above problems (bait contamination and moisture loss) with the prior art.

SUMMARY OF THE INVENTION

A primary objective of the present invention is to supply bait stations, devices, apparatus, systems and methods with gel baits encapsulated in a coated edible paper.

A secondary objective of the present invention is to supply bait stations, devices, apparatus, systems and methods with a wrapped insect bait that is not unsightly to residents and easily placed into or near insect harborages.

A third objective of the present invention is to supply bait stations, devices, apparatus, systems, methods and insect bait applicators with a methodology that prevents gel baits from being contaminated with insecticides.

A fourth objective of the present invention is to provide bait stations, devices, apparatus, systems, and methods with an edible gel bait delivery mechanism that allows for small, premeasured placements to be put into or near insect harborages.

A fifth objective of the present invention is to provide bait stations, devices, apparatus, systems and methods for a delivering a gel bait formulation that is protected and preserved inside of an edible wrapper until eaten by cockroaches. A sixth objective of the present invention is to supply bait stations, devices, apparatus and systems with a bait formulation located inside an edible delivery device, where there is no potential active ingredient contact for residents or applicators.

A seventh objective is to supply bait stations, devices, apparatus and systems with a bait formulation located inside an edible delivery device, where old bait, no longer attractive to cockroaches and other pests, is easily removed from the treated area.

A preferred embodiment can include a bait roll-up having gel baits encapsulated in a coated edible rice paper intended for killing insects. The bait roll-up can be handled by bait applicators without physically touching the gel bait.

The bait roll-up can be applied directly toward cockroach harborages, without exposing surfaces to insecticide. Applicators can handle the bait roll-up without physically touching the gel bait, thus reducing any potential for contamination.

An edible bait delivery system for insects includes an insect bait; and an edible wrapper rolled about the insect bait to form an edible bait delivery system.

The insect bait can include a gel bait. The insect bait can include a granular bait.

The edible wrapper can include rice paper that has been rolled into a cylindrical straw shape, The edible bait delivery system can further include a first coating layer added to the edible wrapper formed from a mixture of approximately 20% stearic and approximately 80% beeswax mixture.

The edible bait delivery system can further include a second coating layer added to the edible wrapper formed from the mixture approximately 20% stearic and approximately 80% beeswax mixture.

The edible bait delivery system can further include a packaging layer wrapped about the rolled insect bait, wherein the packaging layer includes wax paper.

The edible bait delivery system can further include twisted ends on the wrapped insect bait.

The interior gel bait can include a weight of between approximately ¼ gram to approximately 5 grams.

The Bait Roll-up can have a length of approximately 4 cm to approximately 8 cm in length, and a diameter of between approximately 0.25 cm to approximately 1.5 cm.

A method for forming an edible bait delivery system can include the steps of: providing a planar sheet of rice paper; rolling the rice paper into a cylinder shaped as a straw; dipping and coating the rolled cylinder with a beeswax mixture; inserting a gel bait into the coated cylinder; dipping and coating the cylinder with the inserted gel bait with the beeswax mixture to form a double coating; and wrapping the double coating cylinder with the inserted gel bait with wax paper.

The mixture can include a 1:4 mixture of approximately 20% stearic acid and approximately 80% Beeswax.

The method can include the steps of allowing the coated cylinder to dry for at least approximately one hour; and allowing the double coated cylinder to dry for at least approximately one hour.

The method can include twisting opposite ends of the wrapped double coated cylinder with the inserted gel bait.

The gel bait can include a weight of approximately ¼ gram to approximately 5 grams.

The wax paper wrapped double coating cylinder with the inserted gel bait can have an overall weight of between approximately 2 grams to approximately 8 grams.

The wax paper wrapped double coating cylinder with the inserted gel bait can have a length of approximately 4 cm to approximately 8 cm in length, and a diameter of between approximately 0.25 cm to approximately 1.5 cm.

Further objects and advantages of this invention will be apparent from the following detailed description of the presently preferred embodiments which are pictured in the accompanying images.

BRIEF DESCRIPTION OF THE IMAGES

The images depict one or more implementations in accordance with the present concepts, by way of example only, but not by way of limitations.

DESCRIPTION OF THE PREFERRED EMBODIMENTS

Before explaining the disclosed embodiments of the present invention in detail it is to be understood that the invention is not limited in its applications to the details of the arrangements shown since the invention is capable of other embodiments. Also, the terminology used herein is for the purpose of description and not of limitation.

In the Summary above and in the Detailed Description of Preferred Embodiments and in the accompanying images, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying images, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the images and described below, the principles of the present disclosure may be implemented using any number of techniques, whether currently known or not. The present disclosure should in no way be limited to the exemplary implementations and techniques illustrated in the images and described below.

Unless otherwise specifically noted, articles depicted in the images are not necessarily to scale.

A list of components will now be described.

Figure 1:
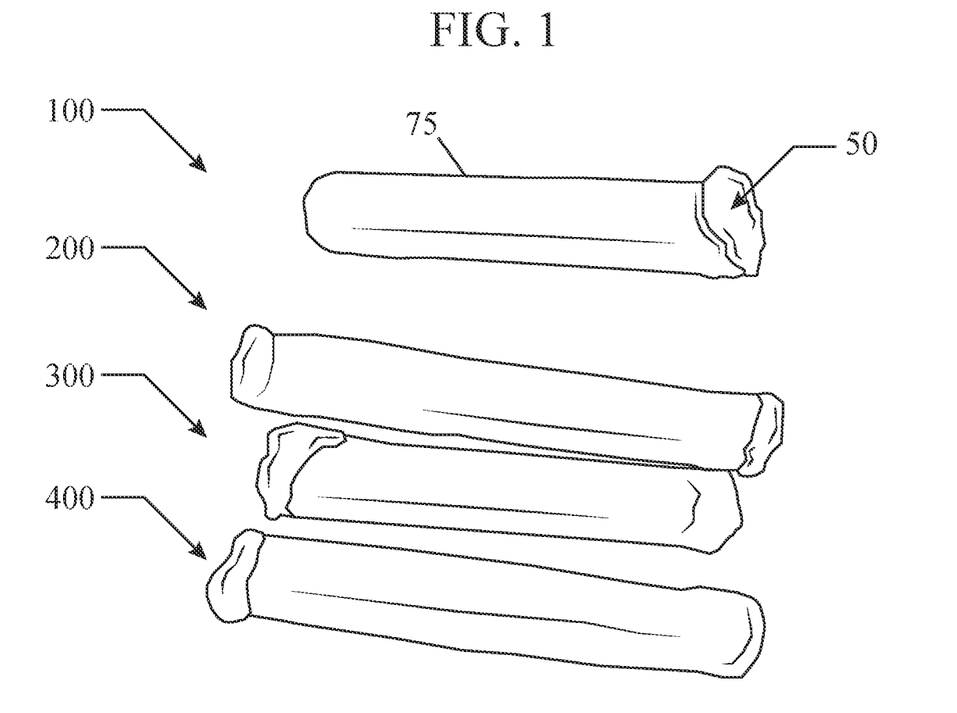
FIG. 1 is a front perspective view of Bait Roll-ups minus packaging.

10 cockroach
50 bait gel
75 edible rice paper.
100 First Bait roll up minus packaging
110 Wrapped Bait roll up
115 wrap wax paper
200 Second Bait roll up minus packaging
300 Third Bait roll up minus packaging
400 Fourth Bait roll up minus packaging
500 Flow Chart of Steps For Making a Bait Roll-up
510 First Step: Provide planar sheet of edible rice paper
520 Second Step: Roll planar sheet into cylinder
530 Third Step: Coat Exterior with 1:4 mixture of 20% Stearic Acid & 80% Beeswax
540 Fourth Step: Insert gel bait into coated cylinder
550 Fifth Step: Dip into 1:4 mixture of 20% Stearic Acid & 80% Beeswax
560 Sixth Step: Seal With Wax Paper FIG. 1 is a front perspective view of Bait Roll-ups 100, 200, 300, 400 minus packaging.

A single bait roll up will now be described.

The coated edible paper 75 can be comprised of an approximately 4 cm×approximately 2.5 cm rice paper square that has been rolled into a cylindrical shape (straw), and then coated with a wax mixture comprised of approximately 20% stearic acid and approximately 80% beeswax (1:4 ratio).

The edible rice paper can be rolled into a straw, then dipped into a melted 1:4 stearic acid:beeswax mixture.

After being dipped into the wax mixture and the straw has cooled and hardened, approximately ¼ gram to approximately 5 grams of cockroach gel bait (preferably approximately 1 to approximately 1.5 grams) 50 is inserted into the straw.

Finally, the waxed paper straw containing the gel bait is again dipped into the melted 1:4 stearic acid:beeswax mixture a second time. The Bait Roll-up is now formed and ready to be packaged.

Insects, such as but not limited to, cockroaches would eat through the Bait Roll-up's coated edible paper and consume the gel bait. The bait could be easily and safely handled.

Gel bait used in the Bait Roll-up can have a weight of approximately ¼ gram to approximately 5 grams (preferably approximately 1 to approximately 1.5 grams.

The Bait Roll-up 100 can have an overall weight between approximately 2 to approximately 8 grams and have a length of approximately 2 to approximately 8 cm long, with a diameter of approximately ¼ cm to approximately 1.5 cm.

An example of a bait rollup can use gel bait of approximately 1 gram, and with an overall weight of approximately 1.65 grams.

An example of a bait roll-up can have a length of approximately 4 cm and a diameter of approximately 0.5 cm.

The Bait Roll-up can be encapsulated in a coated (20% stearic acid and 80% beeswax) edible rice paper.

The gel bait formulations can include but are not limited to Advion Evolution Bait Gel, MaxForce Magnum Gel Bait, Vendetta Nitro Gel Bait, and Hot Shot Ultra Gel Clear Insect Bait.

While a preferred embodiment uses gel bait, other types of bait, such as but not limited to granular formulations can be used.

Granular formulations can include but are not limited to Advion Insect Granular Bait, MaxForce Complete Granular Bait, and Niban Granular Bait.

Figure 2:
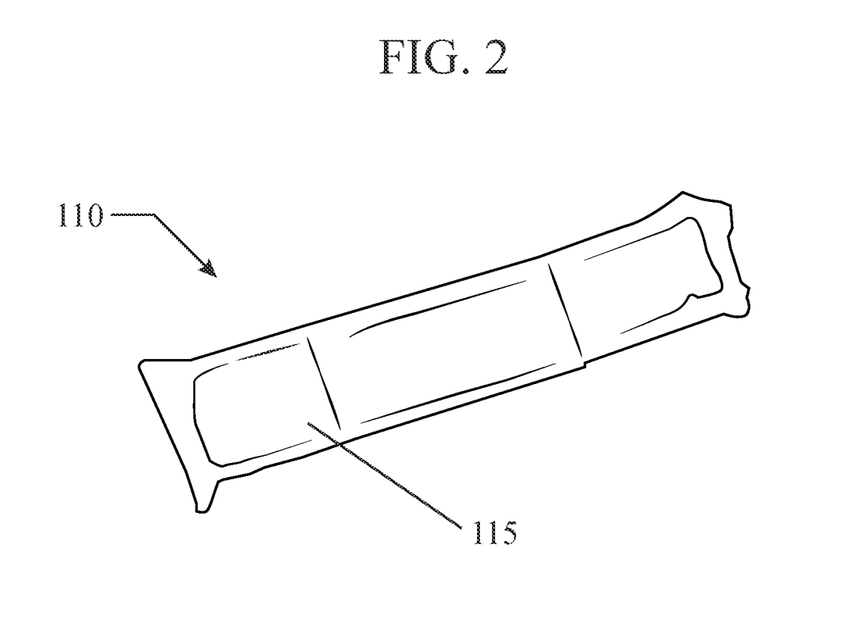
FIG. 2 is a front perspective view of a Bait Roll-up that has been packaged in Reynolds Cut-Rite Wax Paper for protection during shipment.

FIG. 2 is a front perspective view of a Bait Roll-up 110 that has been packaged in Reynolds Cut-Rite Wax Paper 115 for protection during shipment.

This Figure demonstrates the Bait Roll-up being sealed in Reynolds Cut-Rite Wax Paper to demonstrate how to package and store the product. The Bait-rollup can be packaged in wax paper or plastic that is capable of maintaining moisture inside the wrapping.

The wrapping should ideally prevent the Roll-up from dehydration and preserve bait efficacy. This packaging is easy to remove prior to Bait Roll-up application.

Figure 3:
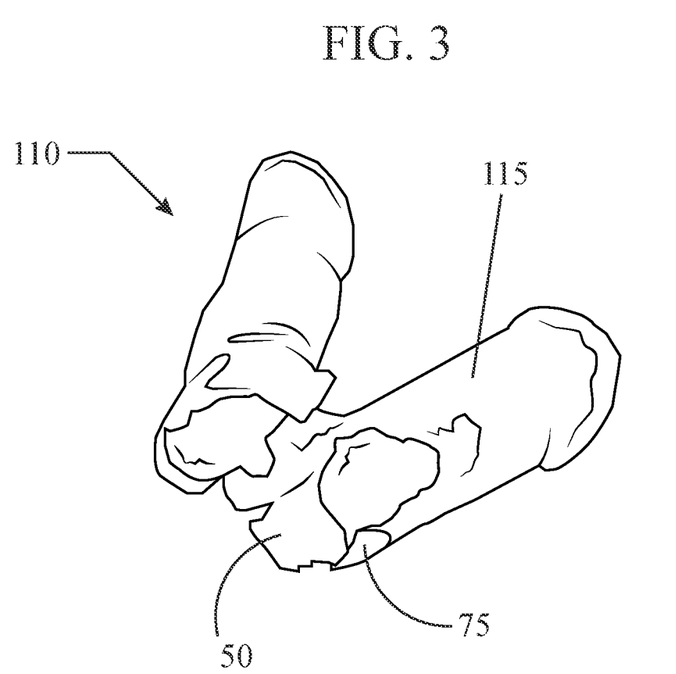
FIG. 3 is a Bait Roll-up that has been broken in half for easy cockroach access.

FIG. 3 is a Bait Roll-up 110 that has been broken in half for easy cockroach access to the gel bait 50 inside the edible paper 75.

The Bait Roll-up is split in half to demonstrate a second method of application. This Bait Roll-up can be broken in half and placed into/near cracks and crevices to facilitate access to pest insects, including but not limited to, cockroaches. The gel bait inside of the Bait Roll-up that is not exposed to the air will maintain moisture and attractiveness to pest insects.

Figure 4:
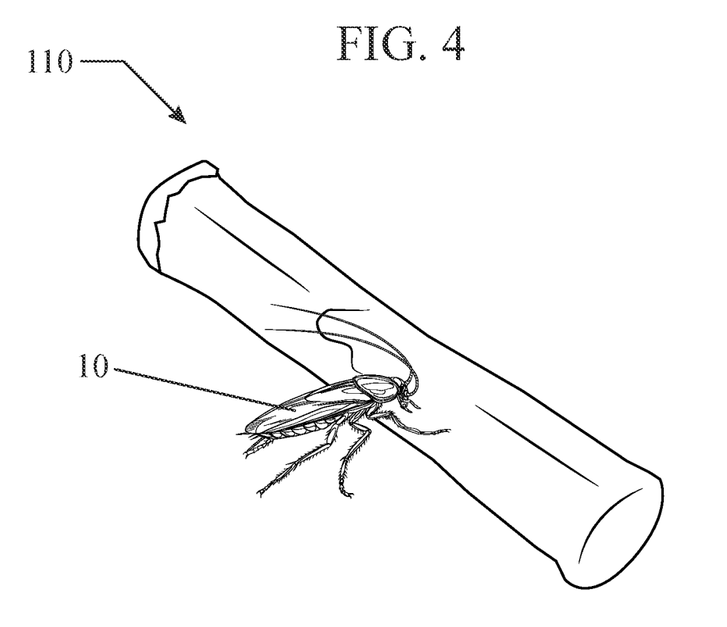
FIG. 4 is a front perspective view of a Bait Roll-up being consumed by a German cockroach.

FIG. 4 is a front perspective view of a Bait Roll-up 110 being consumed by a German cockroach 10. The wax coated edible rice paper is sturdy enough to maintain moisture content in the Bait Roll-up 110 but soft and attractive enough for pest insects, including but not limited to cockroaches, to want to chew through.

A method of making a bait roll-up will now be described.

Figure 5:
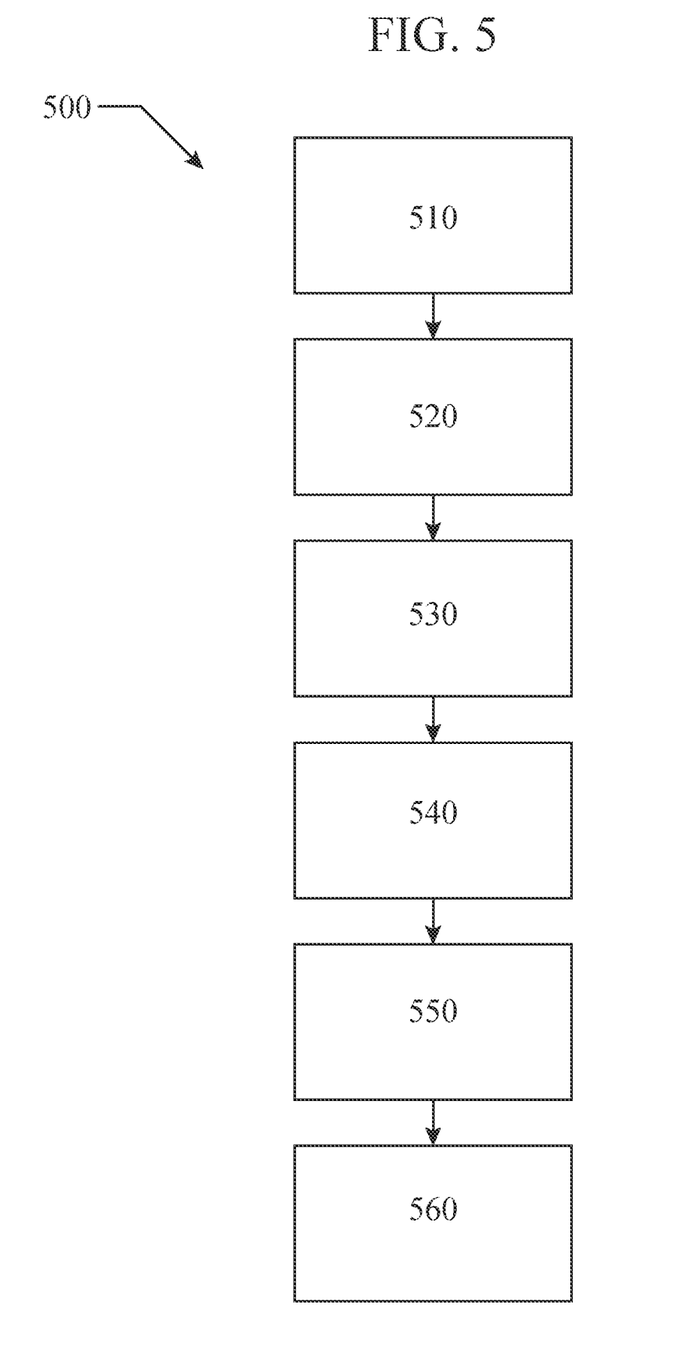
FIG. 5 is a flowchart that shows six steps of making a bait roll-up.

FIG. 5 shows six steps of making a bait Roll-up.

The First Step 510 is to provide a planar sheet of edible rice paper The Second Step 520 is to roll planar sheet into a cylinder, similar to a straw.

The Third Step 530 is to coat by dipping the rolled cylinder with a 1:4 mixture of 20% Stearic Acid & 80% Beeswax and allow to dry for at least one hour.

The Fourth Step 540 insert gel bait into the coated cylinder using a gel bait syringe (gel bait is generally packaged in a gel bait syringe, such as but not limited to Optigar Cockroach Gel bait syringe manufactured by Syngenta Participations AG CORPORATION SWITZERLAND).

The Fifth Step 550 is to dip the coated cylinder with inserted bait, into the 1:4 mixture of 20% Stearic Acid & 80% Beeswax, followed by drying for approximately one hour.

The Sixth Step 560 is to wrap the final product with wax paper. Alternatively, a plastic sheet can be used as the wrap. The ends of wax wrapper can be twisted to further protect the bait.

In another step, the final bait roll-ups products can be then put into airtight plastic bags, bottles and the like, to increase the shelf-life of the gel bait.

Laboratory Testing and Efficacy Studies

Comparing Attractiveness of Bait Roll-Ups and Mortality Rates of Whole and Half Bait Roll-Ups.

Testing comparing the attractiveness of whole and half-broken Bait Roll-ups (with 100% beeswax coating) with peanut butter on German cockroaches (*Blattella germanica*), along with calculating the German cockroach mortality rate of whole and half-broken Bait Roll-ups occurred between May 4, 2021 and May 18, 2021, by co-inventors: Dr. Dini Miller and Morgan Wilson at the Dodson Urban Pest Management Laboratory (DUPML) located on the Virginia Tech University in Blacksburg, VA. All laboratory assays were conducted at DUPML.

Cockroach Rearing

All German cockroaches were reared in the DUPML. The German cockroach colonies were maintained in large plastic rearing containers that had the top 6 cm of the inner walls coated with a thin layer of petroleum jelly: mineral oil mixture (1:2) to prevent cockroach escape. The container lids had holes cut into them that were covered by mesh fabric to allow for ventilation. Each rearing container contained folded cardboard harborages, a vial of water, and dog chow (Pedigree Adult-Complete Nutrition; Mars Petcare; Franklin, TN) for cockroach consumption. All cockroach colonies were maintained in DUPML at 22° C. and L:D 12:12. The strain of German cockroaches used in this study was originally collected from Mosby Court (Richmond Public Housing) in Richmond, VA.

Bioassay Set up

Prior to conducting the laboratory bioassays, groups of 12 to 14 mixed-age German cockroaches were removed from their rearing containers and placed in 4 plastic bioassay arenas (30.5 cm×22.9 cm×10.2 cm). Each arena lid had two holes cut out (3 cm) and covered with mesh fabric to allow for ventilation. The arenas had the top 3 cm of the inner walls coated with a thin layer of petroleum jelly: mineral oil mixture (1:2) to prevent cockroach escape. Each arena contained one cardboard harborage and a vial of water.

On Day 0, all four bioassay arenas were assigned a Petri dish holding a drop of peanut butter (Jif Creamy Peanut Butter). Two of the arenas were provided with a Petri dish holding a whole Bait rollup (100% beeswax coating), and the remaining two arenas were provided with a Petri dish holding a Bait Roll-up that was cut in half (so that one end of the Bait Roll-up had an opening to the bait inside). Both the Petri dishes holding peanut butter and Bait Roll-ups were placed on the same side of each arena, with the peanut butter in one corner and the Bait Roll-up in the opposite corner. All Petri dishes holding peanut butter and Bait Roll-ups were weighed before placement. The weight of a Petri dish was 1.4 grams.

For environmental moisture controls, a Petri dish holding peanut butter, a Petri dish holding a whole Bait Roll-up, and a Petri dish holding a half Bait Roll-up placed in a fifth arena with a vial of water. The environmental moisture controls were weighed before placement. The weight of a Petri dish was 1.4 grams.

Peanut Butter and Bait Rollup Consumption

Each Bait Rollup and peanut butter in each arena was weighed on Days 0, 1, 2, 3 and 7 to quantify consumption (grams). The weight of the Petri dishes was subtracted to get the final weight. The bait weight loss for each arena was used to determine the average consumption of each formulation. All consumption data was corrected by subtracting the environmental control bait weight change taken on the same day.

Table 1 below shows the mean consumption (weight loss) of peanut butter and Bait Roll-ups. German cockroaches consumed a mean of 0.02 grams of peanut butter in all four arenas on Day 7. On Day 7 there was a mean of 0.34 grams of whole Bait Roll-ups consumed by German cockroaches. The mean consumption of the half Bait Roll-ups was 0.15 g on Day 7, which was lower than the whole Bait Roll-ups. However, both types of Bait Roll-ups were consumed in greater amounts than the peanut butter.

TABLE 1

| | Whole Bait Roll-up (n = 2) | | Half Bait Roll-up (n = 2) | |
| --- | --- | --- | --- | --- |
| Day | Peanut Butter (g) | Bait Rollup (g) | Peanut Butter (g) | Bait Rollup (g) |
| 0 | 0.00 | 0.00 | 0.00 | 0.00 |
| 1 | 0.02 | 0.10 | 0.01 | 0.08 |
| 3 | 0.02 | 0.20 | 0.01 | 0.15 |
| 4 | 0.02 | 0.24 | 0.02 | 0.18 |
| 7 | 0.02 | 0.34 | 0.02 | 0.15 |

German Cockroach Mortality

Cockroach mortality was quantified between 9 a.m.-10 a.m. each day for 7 days and again on Day 14. Mortality was determined when cockroaches were unable to right themselves or had stopped moving. The bioassay concluded on Day 14. Two arenas each had one whole Bait Roll-up. Two additional arenas had one-half Bait Roll-up.

Figure 6:
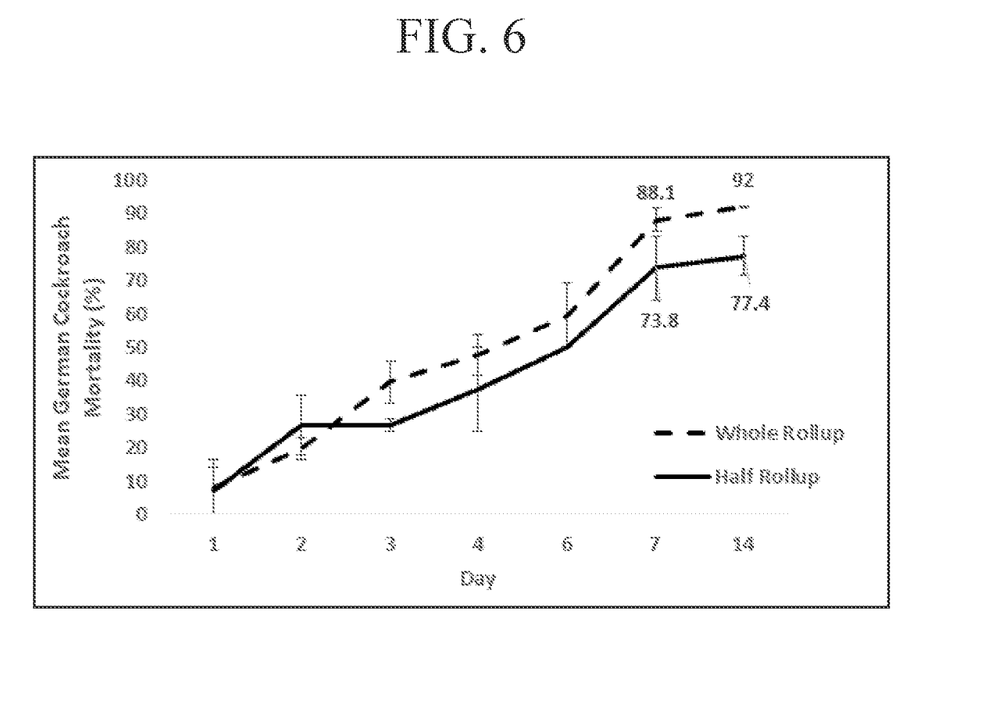
FIG. 6 is a graph that shows the mean mortality (%) of German cockroaches who consumed the whole Bait Roll-ups ("Whole Rollup") and the Bait Roll-ups broken in half ("Half Rollup") over 14 days.

FIG. 6 is a graph that shows the mean mortality of German cockroaches who consumed the whole Bait Roll-ups and the half Bait Roll-ups.

The mean mortality of German cockroaches who were given the whole Bait Rollups (n=2) was 88% on Day 7 and 92% on Day 14.

The mean mortality of German cockroaches who were given the half-broken Bait Rollups (n=2) was 74% on Day 7 and 77% on Day 14.

Evaluations of Aged Bait Roll-Ups (100% Beeswax Coating) and Mortality Rates of Gel Bait and Whole Bait Roll-Ups Testing to determine weight loss of Bait Roll-ups (100% beeswax coating) containing Optigard Cockroach Gel Bait and gel bait (Optigard Cockroach Gel Bait) applied on a Petri dish aged for nine days and evaluate the consumption and the efficacy of aged (nine days) Bait Roll-ups (100% beeswax coating) and aged gel bait applied on a Petri dish for German cockroach control. Testing occurred between May 11, 2021, and Jun. 3, 2021, by co-inventors: Dr. Dini Miller and Morgan Wilson at the Dodson Urban Pest Management Laboratory (DUPML) located on the Virginia Tech University in Blacksburg, VA. All laboratory assays were conducted at DUPML Cockroach Rearing All German cockroaches were reared in the DUPML. The German cockroach colonies were maintained in large plastic rearing containers that had the top 6 cm of the inner walls coated with a thin layer of petroleum jelly: mineral oil mixture (1:2) to prevent cockroach escape. The container lids had holes cut into them that were covered by mesh fabric to allow for ventilation. Each rearing container contained folded cardboard harborages, a vial of water, and dog chow (Pedigree Adult-Complete Nutrition; Mars Petcare; Franklin, TN) for cockroach consumption. All cockroach colonies were maintained in DUPML at 22° C. and L:D 12:12. The strain of German cockroaches used in this study was originally collected from Mosby Court (Richmond Public Housing) in Richmond, VA.

Aged Gel Bait Bioassay Set Up

Six Petri dishes holding Bait Roll-ups (100% beeswax coating) and six gel drops (Optigard Cockroach Gel Bait) applied on Petri dishes were placed in a plastic bioassay arena (30.5 cm×22.9 cm×10.2 cm). Each Petri dish holding the baits were weighed on Day 0 and weighed again on Days 1, 2, 3, 5, 7, 8 and 9. The weight of each Petri dish was 1.51 grams.

German Cockroach Bioassay Set Up

Prior to conducting the laboratory bioassays, groups of 15 (10 adults, 5 nymphs) mixed-age German cockroaches were removed from their rearing containers and placed in 6 Plastic bioassay arenas (30.5 cm×22.9 cm×10.2 cm). Each arena lid had two holes cut out (3 cm) and covered with mesh fabric to allow for ventilation. The arenas had the top 3 cm of the inner walls coated with a thin layer of petroleum jelly: mineral oil mixture (1:2) to prevent cockroach escape. Each arena contained one cardboard harborage, a Petri dish of dog food, and a vial of water. The cockroaches were given 24 hours to acclimate to the arenas before bait was placed.

On Day 0, 3 bioassay arenas were assigned a Petri dish holding an aged Bait Roll-up from the Aged Gel Bait Bioassay, and the 3 remaining arenas were assigned a Petri dish holding an aged gel bait drop from the Aged Gel Bait Bioassay. Both the Petri dishes holding a bait formulation and dog food were placed on the same side of each arena, with the bait formulation in one corner and the dog food in the opposite corner. All Petri dishes holding bait formulations were weighed on Days 0, 4, and 5. The weight of each Petri dish was 1.51 grams.

3 Petri dishes holding an aged Bait Roll-up and three Petri dishes holding an aged gel bait drop from the Aged Gel Bait Bioassays were used for environmental moisture controls. The environmental moisture controls were weighed on Day 0, 4, and 5 of the German cockroach bioassays. The weight of a Petri dish was 1.51 grams.

Aged Bait Rollup Consumption

Each Bait Roll-up and gel bait drop in each arena was weighed on Days 0, 4, and 5 to quantify consumption (grams). The weight of the Petri dishes was subtracted to get the final weight. The bait weight loss for each arena was used to determine the average consumption of each formulation. All consumption data was corrected by subtracting the environmental control bait weight change taken on the same day.

German Cockroach Mortality

Cockroach mortality was quantified between 9 a.m.-10 a.m. on Days 4, 5, 6, 7, 10, 14, and 15. Mortality was determined when cockroaches were unable to right themselves or had stopped moving. The bioassay concluded on Day 15.

Results

Aged Gel Bait Bioassay

Figure 7:
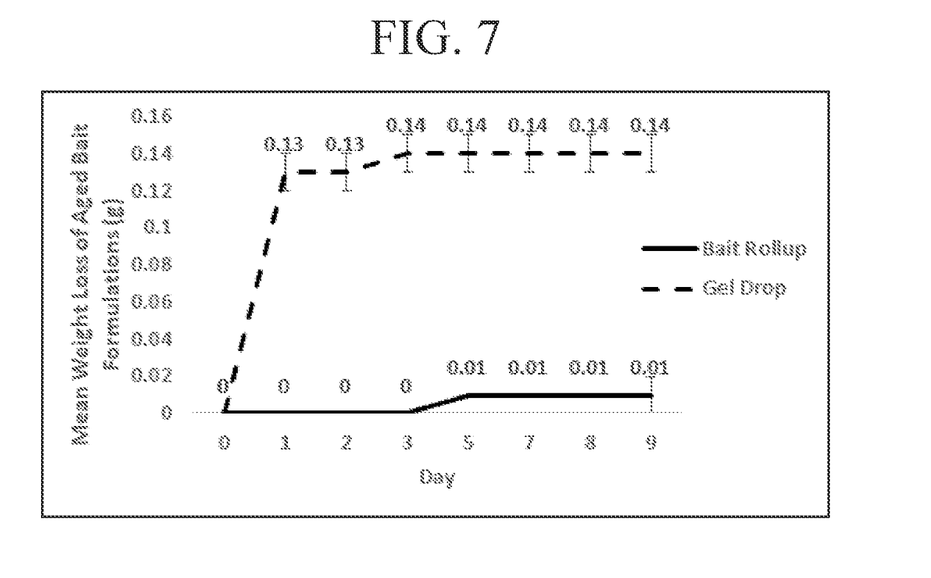
FIG. 7 is a graph that shows the mean weight loss (g) of the aged Bait Rollups (n=6) and the aged gel bait drops (n=6) over 9 days.

FIG. 7 is a graph that shows the mean weight loss (g) of the aged Bait Roll-ups (n=6) and the aged gel bait drops (n=6). The gel bait drops lost a mean of 0.13 grams on Day 1, and lost 0.14 grams by Day 9. The Bait Roll-ups lost much less weight than the gel bait drops, and the Bait Roll-up weight loss was not documented until Day 5. The mean weight loss of the Bait Roll-ups was 0.01 grams on Day 5 and remained 0.01 grams on Day 9.

Aged Bait Rollup Consumption

Table 2 below shows the mean amount of aged (9 days) Bait Roll-ups (n=3) and aged (9 days) gel bait drops (n=3) consumed by German cockroaches. German cockroaches consumed a mean 0.23 grams of the aged Bait Roll-ups by Day 5. This mean consumption was much greater than the amount of aged gel bait drop consumed on Day 5 (0.01 grams). These results show that an aged Bait Roll-up is more attractive to German cockroaches than an aged gel bait.

TABLE 2

| Day | Aged Bait Rollup (g) | Aged Gel Bait Drop (g) |
|---|---|---|
| 0 | 0.00 ± 0.00 | 0.00 ± 0.00 |
| 4 | 0.16 ± 0.00 | 0.01 ± 0.01 |
| 5 | 0.23 ± 0.01 | 0.01 ± 0.01 |

German Cockroach Mortality

Figure 8:
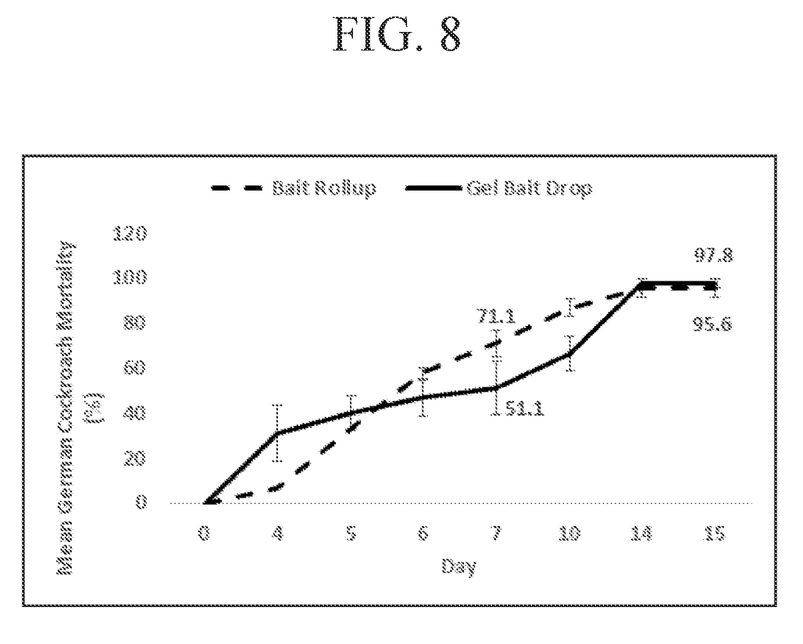
FIG. 8 is a graph showing the mean mortality (%) of German cockroaches with Gel Bait Drops and whole Bait Roll-ups ("Bait Rollup") over 14 days.

FIG. 8 is a graph showing the mortality rate of cockroaches with gel bait drops and whole Bait Roll-ups. The mean German cockroach mortality was similar between the Bait Roll-up arenas (n=3) and the gel bait drop arenas (n=3). The mean mortality produced by the Bait Rollups on Day 7 was 71%, which was higher than what the gel bait drop produced on Day 7, which was 51%. The mean cockroach mortality by Day 14 was 96% in the Bait Roll-up arenas and 98% in the gel bait drop arenas. Applying gel bait drops directly on surfaces in homes is the typical method in German cockroach control. These mortality results show that the aged Bait Rollups produce similar mortality rates as the traditionally placed aged gel bait drop.

Evaluations of the 1:4 Wax Coated Bait Roll-Up (20% Stearic Acid and 80% Beeswax) for Cockroaches.

Testing to evaluate the consumption and the efficacy of Bait Roll-ups (20% STEARIC ACID AND 80% BEESWAX) for German cockroach control. Testing occurred between Aug. 5, 2021 and Aug. 20, 2021, by co-inventors: Dr. Dini Miller and Morgan Wilson at the Dodson Urban Pest Management Laboratory (DUPML) located on the Virginia Tech University in Blacksburg, VA. All laboratory assays were conducted at DUPML.

Cockroach Rearing

All German cockroaches were reared in the DUPML. The German cockroach colonies were maintained in large plastic rearing containers that had the top 6 cm of the inner walls coated with a thin layer of petroleum jelly: mineral oil mixture (1:2) to prevent cockroach escape. The container lids had holes cut into them that were covered by mesh fabric to allow for ventilation. Each rearing container contained folded cardboard harborages, a vial of water, and dog chow (Pedigree Adult-Complete Nutrition; Mars Petcare; Franklin, TN) for cockroach consumption. All cockroach colonies were maintained in DUPML at 22° C. and L:D 12:12. The strain of German cockroaches used in this study was originally collected from Mosby Court (Richmond Public Housing) in Richmond, VA.

Bait Roll-Up Wax Coating (20% Stearic Acid and 80% Beeswax) Formulation

The largest setback for the invention of this Bait Roll-up product has been maintaining the shape and freshness during the accelerated age tests. A beeswax coating cannot maintain freshness for longer than 24 hours in an incubator maintained at 54° C. Paraffin wax and stearic acid will crack and dry out in less than 24 hours in an incubator, even though stearic acid has a high melting point (70° C.). The new 1:4 ratio of stearic acid and beeswax was determined based on U.S. Pat. No. 2,157,625, entitled "High Melting Point Paraffin Waxes and Compositions Thereof" to Page, which is incorporated by reference.

Patent '625 discussed the equation shown below that was used to determine the melting point of a wax mixture:

$$\frac{X \cdot S_1 + Y \cdot S_2}{X + Y} = S_8$$

Where X=the percent of wax having melting point $S_1$, Y=the percent of wax having melting point $S_2$, and $S_3$=the melting point of the mixture. Using this formula, a mixture of 20% stearic acid (melting point 70° C.) and 80% beeswax (melting point 65° C.) would have a high melting point of 66° C. This 1:4 ratio of the new wax mixture will remain attractive and soft enough for German cockroaches to chew through and will be able to withstand the accelerated age test.

To create the new wax coating for the Bait Roll-ups, 5 grams (dry weight) of stearic acid granules and 20 grams of beeswax pellets (dry weight) were mixed together in a small Mason jar. The wax mixture was melted by placing the Mason jar on a hot plate. The melted waxes were mixed together using a hot plate spinner. One tablespoon of light corn syrup to the wax mixture (at the time Morgan Wilson was trying to improve the attractiveness of the rollups, but had since found that the additive makes no difference).

Once the 1:4 ratio Stearic Acid and Beeswax was thoroughly mixed, 6 rice paper straws and 5 sugar sheet (Wilton White Sugar Sheets Edible Decorating Paper) straws were dipped into the mixture. The researchers decided to test the efficacy of sugar sheets to determine if they could be a more attractive Bait Roll-up than what the rice paper produces. The straws were stabilized overnight before Optigard Cockroach Gel Bait was inserted. Morgan Wilson sometimes waited 24 hours to insert the gel bait, but as long as the straws were allowed to cool and stabilize for at least an hour, then the final Bait Roll-up product was not weakened).

Accelerated Aging

Preliminary data showed that the new stearic acid and beeswax mixture did lengthen the life of the Bait Roll-ups during the accelerated age test, however, the Bait Roll-ups still cracked and dried in the incubator after a few days. Morgan Wilson decided to experiment with wrapping and packaging the Bait Roll-ups to simulate the final marketed product in order to improve the life of the baits.

One Bait Roll-up made with a sugar sheet ("Sugar Roll") and two Bait Rollups made with rice paper ("Rice Roll") were wrapped in Reynolds Cut-Rite wax paper squares. After weighing the wrapped Bait Rollups, each was placed in a glass vial sealed with a cotton ball. The vials with the Bait Roll-ups were placed in an incubator held at 54° C. for 14 days.

Bioassay Set up

Prior to conducting the laboratory bioassays, groups of 10 mixed-stage German cockroaches were removed from their rearing containers and placed in 6 plastic bioassay arenas (30.5 cm×22.9 cm×10.2 cm). Each arena lid had two holes cut out (3 cm) and covered with mesh fabric to allow for ventilation. The arenas had the top 3 cm of the inner walls coated with a thin layer of petroleum jelly: mineral oil mixture (1:2) to prevent cockroach escape. Each arena contained one cardboard harborage, a Petri dish of dog food, and a vial of water.

On Day 0, two bioassay arenas were assigned a "Sugar Roll" and three bioassay arenas were assigned a "Rice Roll". A sixth arena was assigned a "bait taco", which is the standard method Dr. Miller's laboratory uses when applying cockroach gel bait (a line of gel bait is placed on a creased wax paper square). Both the dog food and the bait formulations were placed on the same side of each arena, with the dog food in one corner and the bait formulation in the opposite corner.

For environmental moisture controls, a "Sugar Roll", a "Rice Roll", and a "bait taco" were placed in a seventh arena with a vial of water. The environmental moisture controls were weighed before placement.

Bait Roll-Up Consumption

The two Bait Roll-ups with sugar sheet wrapping ("Sugar Roll") and three Bait Roll-ups with rice paper wrapping ("Rice Roll") were weighed on Days 0, 1, 2, 3, 4, 5, 6, 7, 11 and 14 to quantify consumption. The "bait taco" was weighed on Days 0, 1, 2, 3, 4 and 11. The bait weight loss for each arena was used to determine the average consumption of each formulation. All consumption data was corrected by subtracting the environmental control bait weight change taken on the same day.

German Cockroach Mortality

Cockroach mortality was quantified between 9 a.m.-10 a.m. each day for 7 days and again on Days 10, 11 and 14. Mortality was determined when cockroaches were unable to right themselves or had stopped moving. The bioassay concluded on Day 14.

Results

Accelerated Aging

The accelerated age test was terminated on Day 7 because all three Bait Roll-ups broke and dried up. Even though the Bait Roll-ups remained fresh and viable for the initial 7 days, it was clear that sealing the vials with cotton balls was not airtight enough to keep the Bait Roll-ups from cracking and desiccating. Morgan Wilson repeated this test on a future date, but instead of sealing the wrapped Bait Rollups in vials enclosed with cotton balls, she sealed them in vials with air-tight twisting seals. These glass vials were the most airtight container in the laboratory.

Bait Consumption

German cockroaches were documented chewing through the "Rice Rolls" by Day 2, and chewing through a "Sugar Roll" by Day 3. Under Dr. Miller's instruction, the Bait Roll-ups were broken in half on Day 3 to allow greater access to the gel bait. The table shows the mean bait consumption (weight loss). German cockroaches consumed a mean of 0.14 grams of "Sugar Roll" Bait Roll-ups on Day 14. There was a mean consumption of 0.18 grams of "Rice Roll" Bait Roll-ups on Day 14, which was greater than the "Sugar Roll" consumption.

Unlike the Bait Roll-ups, the "bait taco" was mostly consumed during the first day when the bait was the freshest. The bait consumption of the "bait taco" on Day 1 was 0.08 grams. After Day 1, the moisture control "bait taco" lost more weight while the arena "bait taco" lost no weight. As a result, the Day 14 "bait taco" consumption was -0.11 grams.

Table 3 shows the consumption rate between a "Sugar Roll" Bait Roll-up, a "Rice Roll" Bait Roll-up, and a "bait taco." The bait taco had exposed gel bait, while the other Bait Roll-ups did not have exposed gel bait.

TABLE 3

| Day | Mean Sugar Roll Consumption (n = 2) | Mean Rice Roll Consumption (n = 3) | Bait Taco Consumption (n = 1) |
| --- | --- | --- | --- |
| 1 | −0.01 g ± 0.00* | 0.03 g ± 0.01 | 0.08 g |
| 14 | 0.14 g ± 0.0 | 0.18 g ± 0.02 | −0.11 g* |

*The negative consumption numbers indicated that the moisture controls lost more weight than the arena baits consumed by the cockroaches.

German Cockroach Mortality

Figure 9:
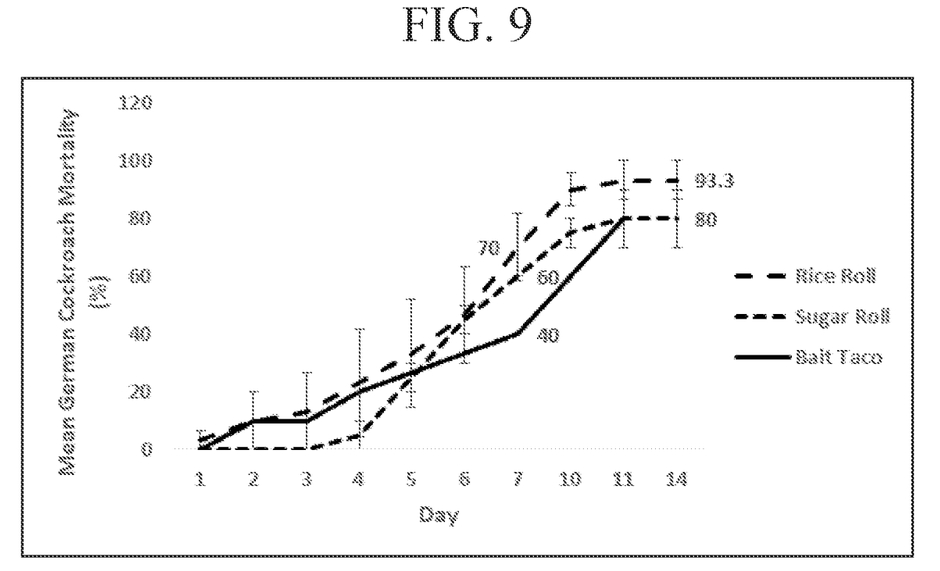
FIG. 9 is a graph that shows the mean mortality (%) of German cockroaches who consumed the "Rice Roll" Bait Roll-ups (n=3), the "Sugar Roll" Bait Roll-ups (n=2), and the "bait taco" (n=1) over 14 days.

FIG. 9 is a graph that shows the mean mortality of German cockroaches who consumed the "Rice Roll" Bait Roll-ups (n=3), the "Sugar Roll" Bait Roll-ups (n=2), and the "bait taco" (n=1). The mean mortality of German cockroaches who were given the "Rice Roll" Bait Roll-ups (n=3) was 70% on Day 7, and 93% on Day 14. The mean mortality of German cockroaches who received the "Sugar Roll" Bait Roll-up (n=2) was 60% on Day 7, and 80% on Day 14. The "bait taco" arena was only monitored for 11 days; the mean mortality was 40% on Day 7 and 80% on Day 11.

All three types of bait formulations produced high mortalities (between 80% and 93%). However, German cockroaches consumed the greatest amount of Bait Roll-ups made with rice paper and had the highest mortalities of the three different types.

Accelerated Age Test (54° C. For 14 Days) for Bait Roll-Ups Coated with 20% Stearic Acid, and 80% Beeswax)

Testing to evaluate the shelf life of bait roll-ups coated with 1:4 stearic acid: beeswax mixture that have been wrapped in wax paper and sealed in glass vials for a 14-day accelerated age test. And to evaluate the efficacy of bait roll-ups coated with 1:4 stearic acid and beeswax mixture that have gone through an accelerated age test for German cockroach (*Blattella germanica*) control. Testing occurred between Aug. 17, 2021 and Sep. 14, 2021, by co-inventors: Dr. Dini Miller and Morgan Wilson at the Dodson Urban Pest Management Laboratory (DUPML) located on the Virginia Tech University in Blacksburg, VA. All laboratory assays were conducted at DUPML Cockroach Rearing All German cockroaches were reared in the DUPML. The German cockroach colonies were maintained in large plastic rearing containers that had the top 6 cm of the inner walls coated with a thin layer of petroleum jelly: mineral oil mixture (1:2) to prevent cockroach escape. The container lids had holes cut into them that were covered by mesh fabric to allow for ventilation. Each rearing container contained folded cardboard harborages, a vial of water, and dog chow (Pedigree Adult-Complete Nutrition; Mars Petcare; Franklin, TN) for cockroach consumption. All cockroach colonies were maintained in DUPML at 22° C. and L:D 12:12. The strain of German cockroaches used in this study was originally collected from Mosby Court (Richmond Public Housing) in Richmond, VA.

Accelerated Age Test

Three Bait Roll-ups coated with 20% stearic acid 80% beeswax containing Optigard Cockroach Gel Bait were each wrapped in Reynolds Cut-Rite wax paper squares and sealed in closed, glass vials. The three wrapped Bait Roll-ups were weighed (g) within the Reynolds wax paper before being placed into the glass vial on Day 0. For comparison, a fourth Bait Rollup was weighed and sealed in a closed, glass vial without being wrapped in the Reynolds wax paper.

On Day 0, the four Bait Roll-ups that were sealed in glass vials were placed in an incubator maintained at 54° C. and ~16% relative humidity. The Bait Roll-ups remained in the incubator held at 54° C. for 14 days. On Day 14, the glass vials were removed from the incubator, then the wrapped Bait Roll-ups and unwrapped Bait Roll-up were removed from the vials. The wrapped and unwrapped Bait Roll-ups were weighed to calculate any moisture loss that occurred during the accelerated age test.

Glass vials were used for holding three wrapped Bait Roll-ups and one unwrapped Bait Roll-up in an incubator held at 54° C. for the accelerated bait test.

The two weeks (14 days) was to be equivalent to a two (2) year shelf life, which is generally required by the EPA (Environmental Protection Agency) for bait stations.

Mortality Bioassay Set Up

Prior to conducting the mortality bioassay, groups of 10 mixed-sex adult German cockroaches (5 males and 5 females) were removed from their rearing containers and placed in 4 large plastic bioassay arenas (38.1 cm×33.0 cm×16.5 cm). Each arena lid had one hole cut out of it (11.4 cm) and the hole was covered with mesh fabric to allow for ventilation. The arenas had the top 3 cm of the inner walls coated with a thin layer of petroleum jelly: mineral oil mixture (1:2) to prevent cockroach escape. Each arena contained one cardboard harborage, a Petri dish containing dog food, and a vial of water.

On Day 0 of the mortality bioassay, all four bioassay arenas were assigned a Bait Roll-up that had been in an incubator held at 54° C. for 14 days for the accelerated age test. The 3 Bait Roll-ups that were wrapped in Reynolds wax paper were unwrapped, and all 4 Bait Roll-ups were placed in each arena. The Bait Roll-ups were placed on the same side of the arena as the dog food in opposite corners. The Bait Roll-ups were placed intact into the arenas on Day 0, but were split in half on Day 2 (per Dr. Miller's instruction) so that German cockroaches had easy access to the gel bait.

German Cockroach Mortality

Cockroach mortality was quantified between 9 a.m.-10 a.m. on Days 1, 2, 3, 4, 6, 7, 8, 11 and 14. Mortality was determined when cockroaches were unable to right themselves or had stopped moving. The bioassay concluded on Day 14.

Results

Accelerated Age Test

Table 4 below shows the weights of all four Bait Roll-ups before being placed in the incubator (Day 0) and after being removed from the incubator on Day 14. The unwrapped Bait Roll-up weight loss was similar to the weight losses of the wrapped bait, showing that the glass vials were able to seal the moisture and prevent desiccation. One of the wrapped Bait Roll-ups was damaged while being inserted into its glass vial on Day 0, so it lost 0.3 grams by Day 14. However, the glass vial prevented this third wrapped Bait Roll-up from desiccating. The mean weight loss of the four Bait Roll-ups was only 0.09 grams on Day 14. All four baits were fresh and moist after the accelerated bait test, and they were assigned to an arena for the mortality bioassay.

TABLE 4

|  | Wrapped Bait 1 | Wrapped Bait 2 | Wrapped Bait 3 | Unwrapped Bait 4 | Mean ± SD |
| --- | --- | --- | --- | --- | --- |
| Weight on Day 0 (g) | 1.85 | 1.67 | 1.67 | 1.47 | 1.67 ± 0.08 |
| Weight on Day 14 (g) | 1.82 | 1.65 | 1.37* | 1.46 | 1.58 ± 0.10 |
| Weight Loss (g) | 0.03 | 0.02 | 0.3* | 0.01 | 0.09 ± 0.07 |

*Bait # 3 lost weight. It was likely cracked during insertion into the small vial on Day 0. Because it was sealed in the glass vial, Bait # 3 did not dry out, so it was used in the mortality bioassay.

A Bait Roll-up that was removed from its vial and wrapping prior to being placed in an arena. This Bait Rollup only lost 0.02 grams from the accelerated age test, and the gel bait remained fresh inside the stearic acid:beeswax coated straw.

German Cockroach Mortality

Figure 10:
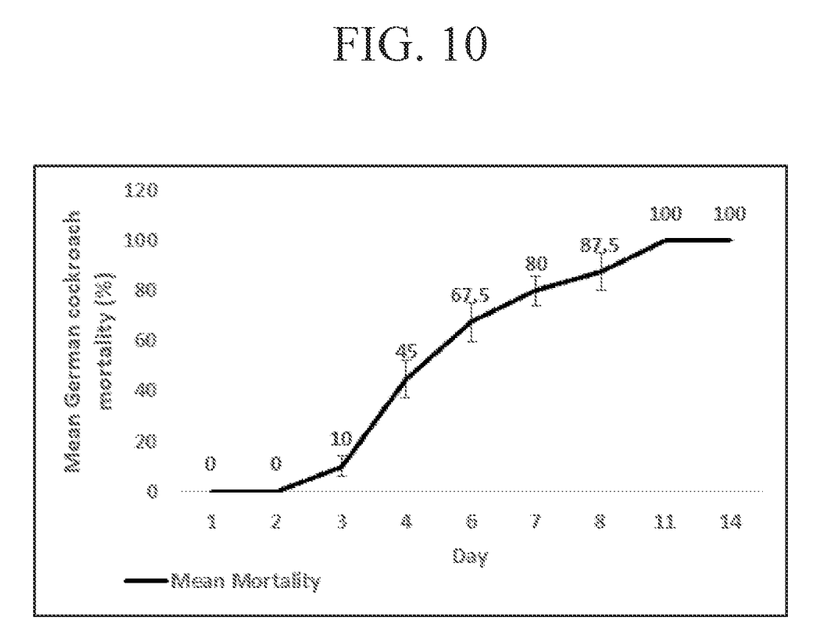
FIG. 10 is a graph showing the mean mortality (%) rate of the German cockroaches eating the Bait Roll-ups over 14 days.

Cockroaches were chewing through the Bait Roll-ups on Day 1, even before they were split in half on Day 2. FIG. 12 is a graph that shows the mean mortality of German cockroaches that consumed the Bait Roll-ups. On Day 7 there was 80% mean mortality (n=4). On Day 11 there was 100% mean mortality. The Bait Roll-ups that went through the accelerated age test were able to kill 100% of the German cockroaches before Day 14.

The third wrapped Bait Roll-up was damaged during the accelerated bait test. Notice that German cockroaches still chewed through the Bait Roll-up to consume the gel bait.

FIG. 10 is a graph showing the mean mortality rate of the German cockroaches that consumed the Bait Roll-ups over 14 days. By Day 14 there was 100% mortality of the cockroaches.

Novel Functional Attributes of the Bait Roll-Ups Include:
1. The edible delivery device limits moisture loss from surface of the bait formulation into the environment after removal from packaging.
2. Edible coating reduces gas exchange between the bait formulation and the environment which delays the bait degradation.
3. By restricting the exchange of volatile components, the edible coating enhances and prolongs the efficacy of bait formulations.

Advantages of the Bait Roll-Ups Include:
1. The Bait Roll-up can be easily placed in harborage locations.
2. The gel bait is applied at a standard amount (approximately ¼ gram to approximately 5 grams).
3. The Bait Roll-up can be easily removed after consumption and disposed of as waste.
4. The Bait Roll-up prevents human contact with gel bait.
5. The Bait Roll-up does not contaminate surface with insecticide.
6. The Bait Roll-up can be placed in drawers, among papers, and on countertops and painted surfaces without leaving bait residue.
7. The Bait Roll-up's coated edible paper protects the gel bait from contamination (molds, airborne particles, insecticides, etc.).
8. The gel bait remains fresh inside the Bait Roll-up.
9. The Bait Roll-up can be removed when the bait placement is no longer needed or attractive to cockroaches and other pests.

While the method includes drying of at least one hour after coating, commercialization can reduce drying time substantially as needed.

In order to discourage children or pets from eating the wrapped bait, a bittering agent could be added to the bait wrap. It could be mixed into the beeswax/stearic acid mixture for one or both of the coating steps. Examples of bittering agents include but are not limited to Denatonium, Sucrose octaacetate, Quercetin, Brucine, or Qassin. Bitterants would be used to prevent child and pet poisonings.

The term "approximately"/"approximate" can be +/−10% of the amount referenced. Additionally, preferred amounts and ranges can include the amounts and ranges referenced without the prefix of being approximately.

While the preferred embodiment of the invention is directed toward an edible delivery system for killing pest insects, such as but not limited to cockroaches, the invention can be used for other insects, such as but not limited to ants, beetles, and the like.

Although specific advantages have been enumerated above, various embodiments may include some, none, or all the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, pictured, and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An edible bait delivery system for killing cockroaches, consisting of:
    an insect bait selected from one of a gel bait and a granular bait, the insect bait includes a weight of between approximately ¼ gram to approximately 5 grams; and
    an edible wrapper of rice paper rolled about the insect bait to form a bait roll-up having a cylindrical straw shape for the cockroaches, the rolled edible wrapper for protecting and preserving the insect bait to maintain moisture content to the insect bait until eaten by the cockroaches, the bait roll-up having a length consisting of between approximately 4 cm to approximately 8 cm in length, and a diameter consisting of between approximately 0.25 cm to approximately 1.5 cm; and
    a bittering agent added to bait roll-up, the bittering agent selected from the group consisting of Denatonium, Sucrose octaacetate, Quercetin, Brucine, and Qassin, wherein the bait roll-up increases mortality rate for killing the cockroaches from using the insect bait without the edible wrapper.

2. The edible bait delivery system of claim 1, wherein the insect bait includes the gel bait.

3. The edible bait delivery system of claim 1, wherein the insect bait includes the granular bait.

4. An edible bait delivery system for killing cockroaches, consisting of:
    an insect bait selected from one of a gel bait and a granular bait, the insect bait includes a weight of between approximately ¼ gram to approximately 5 grams; and
    an edible wrapper of rice paper rolled about the insect bait to form a bait roll-up having a cylindrical straw shape for the cockroaches, the rolled edible wrapper for protecting and preserving the insect bait to maintain moisture content to the insect bait until eaten by the cockroaches, the bait roll-up having a length consisting of between approximately 4 cm to approximately 8 cm in length, and a diameter consisting of between approximately 0.25 cm to approximately 1.5 cm; and
    at least one first edible coating layer added to the edible wrapper which delays bait degradation, the first edible coating layer formed from a first coating mixture consisting of approximately 20% stearic acid and approximately 80% beeswax, and
    a bittering agent added to the at least one first edible coating layer, the bittering agent selected from the group consisting of Denatonium, Sucrose octaacetate, Quercetin, Brucine, and Qassin, wherein the bait roll-up increases mortality rate for killing of the cockroaches from using the insect bait without the edible wrapper.

5. The edible bait delivery system of claim 4, wherein the at least one first edible coating layer includes
    a second edible coating layer added to the edible wrapper with the first edible coating layer, the second edible coating layer formed from a second coating mixture consisting of approximately 20% stearic acid and approximately 80% beeswax.

6. An edible bait delivery system for killing cockroaches, consisting of:
    an insect bait selected from one of a gel bait and a granular bait, the insect bait includes a weight between approximately ¼ gram to approximately 5 grams; and
    an edible wrapper of rice paper rolled about the insect bait to form a bait roll-up having a cylindrical shape for the cockroaches, the rolled edible wrapper for protecting and preserving the insect bait to maintain moisture content to the insect bait until eaten by the cockroaches, the bait roll-up having a length consisting of between approximately 4 cm to approximately 8 cm in length, and a diameter consisting of between approximately 0.25 cm to approximately 1.5 cm;
    a first edible coating layer added to the edible wrapper which delays bait degradation, the first edible coating layer formed from a first coating mixture consisting of approximately 20% stearic acid and approximately 80% beeswax;
    a second edible coating layer added to the edible wrapper with the first edible coating layer, the second edible coating layer formed from a second coating mixture consisting of approximately 20% stearic acid and approximately 80% beeswax; and
    a bittering agent added to at least one of the first coating mixture and the second coating mixture, the bittering agent selected from the group consisting of Denatonium, Sucrose octaacetate, Quercetin, Brucine, and Qassin; and
    a packaging layer wrapped about the rolled insect bait, wherein the packaging layer includes wax paper, wherein the wrapped packaged layer on the bait roll-up has a length consisting of between approximately 4 cm to approximately 8 cm in length, and a diameter consisting of between approximately 0.25 cm to approximately 1.5 cm, wherein the bait roll-up increases mortality rate for killing the cockroaches from using the insect bait without the edible wrapper.

\* \* \* \* \*